UNITED STATES PATENT OFFICE.

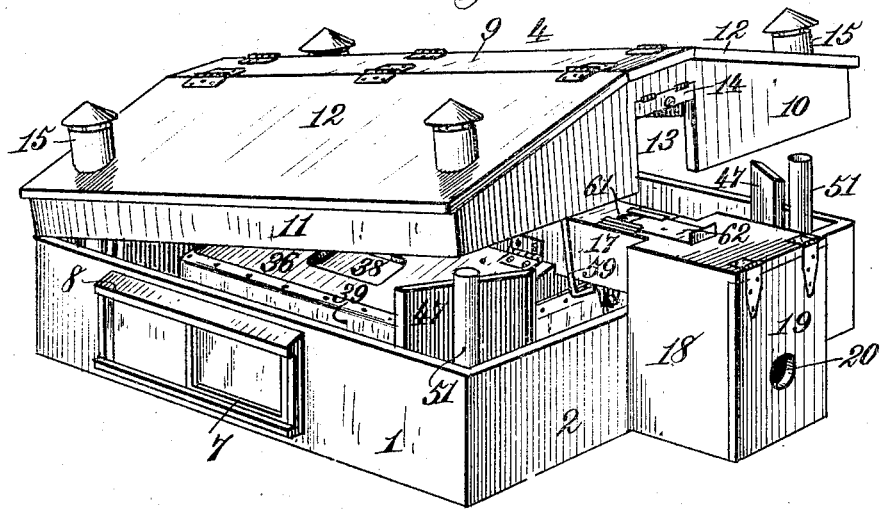
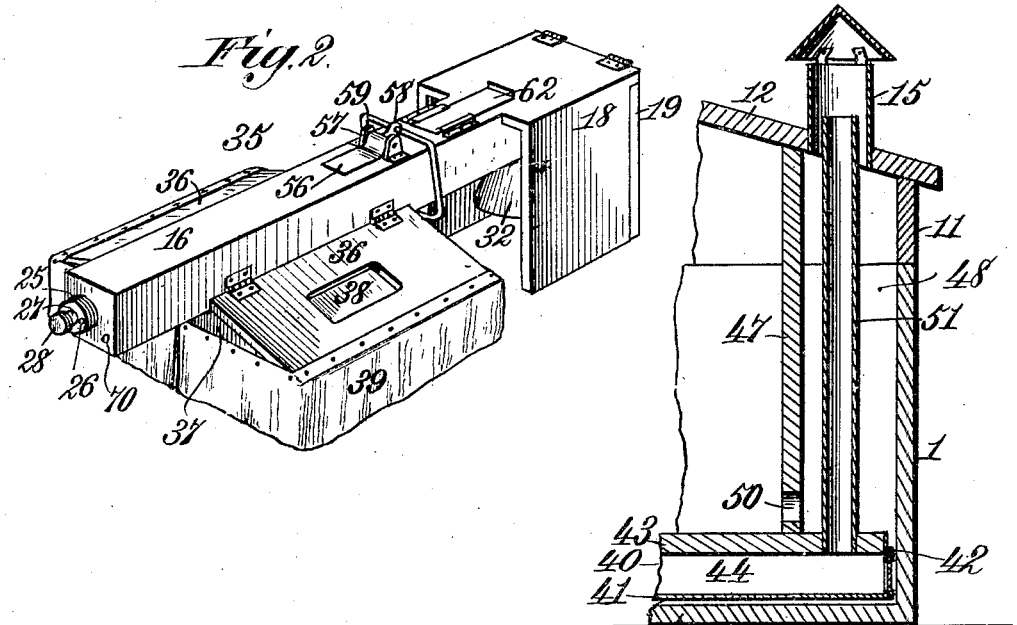

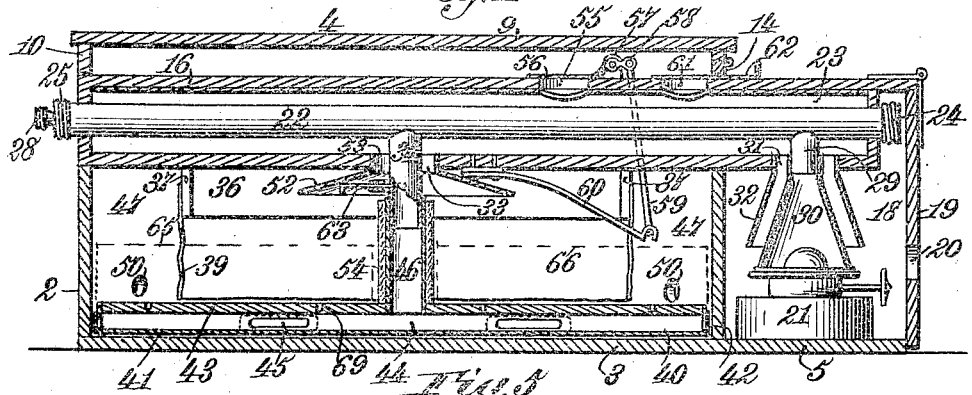

WALTER P. JONES, OF GLENCARLYN, VIRGINIA.

BROODER.

SPECIFICATION forming part of Letters Patent No. 706,953, dated August 12, 1902.

Application filed May 8, 1902. Serial No. 106,389. (No model.)

*To all whom it may concern:*

Be it known that I, WALTER P. JONES, a citizen of the United States, residing at Glencarlyn, Alexandria county, Virginia, have invented certain new and useful Improvements in Brooders, of which the following is a specification.

My invention is designed for the production of an improved brooder for raising and developing artificially-hatched chickens.

One of the principal objects of the invention is to provide novel means for heating the floor of the brooding-chamber, so as to do away with the necessity for elevating the brooder from the ground for the purpose of introducing a lamp or other heating device beneath the same, the objection to this old method of heating the floor being that the exit-openings from the brooding-chamber are necessarily elevated, requiring the small chicks to go down an incline in order to reach the ground and to walk up the same in order to return to the brooder.

A further object of the invention is to provide means whereby top and bottom heat for the brooding-chamber can be obtained, with the provision of means for cutting off the bottom heat when desired.

A further object of the invention is to provide novel means for ventilating the brooding-chamber through the action of the lamp or other heating device.

A further object of the invention is to provide novel means whereby the brooding-chamber may be divided into a plurality of compartments for raising chicks of different ages.

A further object of the invention is to provide means whereby the entire heating apparatus may be readily and conveniently removed in warm weather or when the chicks have reached an age when they do not require artificial heat.

A further object of the invention is to provide novel means for connecting the lamp with the pipe which carries the products of combustion through the machine, which effectively prevents the admission of any products of combustion into the brooding-chamber.

Other objects of the invention will hereinafter appear, and the novel features thereof will be set forth in the claims.

In the drawings forming part of this specification, Figure 1 is a perspective view of my improved brooder, showing the top or cover thereof slightly elevated at one end. Fig. 2 is a perspective view of the heat conducting and radiating conduit carrying the lamp-box and the hover. Fig. 3 is a vertical sectional view taken through one corner of the device. Fig. 4 is a vertical central longitudinal sectional view of the apparatus. Fig. 5 is a vertical central cross-section of the same, and Fig. 6 is a sectional plan view.

Like reference-numerals indicate like parts in the different views.

My improved brooder comprises a box or casing made up of the parallel sides 1, ends 2, bottom 3, and top or cover 4. The sides 1, ends 2, and bottom 3 are all rigidly connected with each other, but the top or cover 4 is removably mounted on the other parts. The bottom 3 is extended at one end beyond the end 2 to form the bottom 5 of the lamp-box, to be hereinafter referred to. Both of the sides 1 are provided with openings 6, designed for the passage of the chicks into and out of the brooder, the same being adapted to be closed by the window-sashes 7, mounted to slide in the guideways 8.

The top or cover 4 is made up of the ridge-piece 9, the ends 10, connected by the strips 11, and the lids 12, hinged to the ridge-piece 9, supported when in closed position upon the ends 10 and the strips 11 and adapted to be raised for the purpose of gaining admission to the interior of the brooder. Each of the ends 10 is provided at a point directly beneath the ridge-piece 9 with rectangular openings 13, for a purpose which will hereinafter appear, and hinged to one of the ends 10 is a flap 14, designed for the purpose of increasing or decreasing the height of the opening 13 in which it is mounted.

Mounted upon and carried by the lids 12 of the cover 4 are the hooded chimneys 15, the same being located one at each corner of the brooder and terminating at their lower ends at or adjacent to the lower surfaces of the lids on which they are mounted.

Extending longitudinally through the center of the machine, adjacent to the upper end thereof, is a heat conducting and radiating conduit 16, the same being preferably constructed of wood, rectangular in cross-section and supported upon the ends 2 of the brooder-casing. Said conduit fits within the openings 13 in the ends 10 of the cover 4, as clearly shown. The said conduit is preferably lined on its inner upper surface with an arch-shaped strip 17, of sheet metal. The same terminates at one end in the same plane with one of the ends 2, but extends at its other end beyond the other end 2 to a point above the extension 5 of the bottom 3, which constitutes the bottom for the lamp-box 18. The said lamp-box is itself secured to and carried by the conduit 16, the same being preferably rectangular in shape and having a hinged door 19, provided with an opening 20 for the admission of air to support combustion of the lamp and for the supply of the brooding-chamber. The door 19 provides for the ready removal and insertion of the lamp 21, and while it has been shown at one end of the lamp-box 18 it is obvious that it may be otherwise disposed, if desired. Other means than the opening 20 may be provided for the admission of air to the interior of the lamp-box.

Extending centrally through the conduit 16 is a metallic pipe 22 for products of combustion, the same being of smaller diameter than the conduit 16, so as to provide an annular passage 23 around it for supplying air to the interior of the brooder. The ends of the pipe 22 project beyond the ends of the conduit 16 and receive the caps 24 25. These caps may be removed for the purpose of swabbing out or otherwise cleaning the interior of the pipe 22. The cap 25 at the rear end of the machine is provided with a restricted opening 26, for a purpose which will be explained later, and also with a contracted neck or nozzle 27, on which fits a removable cap 28.

Secured to the pipe 22 above the lamp 21, communicating with the interior of said pipe, and extending downwardly therefrom is a nipple 29, which carries the metallic chimney 30 for the lamp 21. The said nipple 29 extends through an opening 31 in the bottom wall of the conduit 16, and fitting within said opening is a funnel 32, which surrounds the chimney 30, but terminates, preferably, at a point above the lower end of said chimney. At the center of the brooder-casing the bottom wall of the conduit 16 is provided with an opening 33, through which projects a tubular branch 34 of the pipe 22.

Surrounding the branch pipe 34 is a hover 35, the same comprising the two-part covers 36, hinged at their inner ends to the opposite sides of the conduit 16 and having connected to the under sides thereof the strips 37, which are rabbeted or cut away at their inner ends to receive the lower side of the conduit 16. These strips 37 abut against each other at their inner ends and are supported and held in position by their engagement with the under side of the conduit 16. The covers 36 are provided with openings 38, covered with glass, if desired, for the admission of light to the interior of the hover. Tacked to the outer edges of the covers 36 and to the lower edges of the strips 37 is the hover-cloth 39, which extends down to a point adjacent to the floor of the brooding-chamber.

Located and removably mounted in the brooding-chamber and supported upon the bottom 3 thereof is a hollow floor 40, the same being preferably made up of a rectangular strip 41 of sheet metal having upwardly-extending flanges 42 around its edges and a wooden flooring 43, secured to said metal strip, but separated therefrom to form the space 44, through which the products of combustion are caused to pass. For cleaning the space 44 between the two parts of the floor 40 I form in the flanges 42, on opposite sides of the brooder, the openings 45, through which a cleaning device of any suitable kind may be introduced, the said openings being normally closed by slides or covers of any suitable kind. Secured to the flooring 43, extending upwardly therefrom, and communicating with the space 44 beneath said flooring is a pipe 46, having a slip-joint or telescopic connection with the pipe 34, heretofore referred to.

Located within the brooding-chamber, at each corner thereof and diagonally disposed with respect to the sides 1 and ends 2, are the partitions 47, the same forming the triangular compartments 48 at each corner of the device. These partitions 47 are provided with openings 50 near their lower ends which communicate with the compartments 48. In said compartments 48 are the escape-flues 51, which extend through the flooring 43 at their lower ends and communicate with the space 44 beneath said flooring. At their upper ends the flues 51 project into the hooded chimneys 15, as most clearly shown in Fig. 3 of the drawings.

From the foregoing description it will be seen that the products of combustion from the lamp 21 pass from the chimney 30 thereof through the nipple 29 into the pipe 22 and thence pass down through the telescoping pipes 34 and 46 into the space 44 beneath the flooring 43. From the said space the products of combustion are carried off to the atmosphere at the four corners of the brooder through the escape-flues 51 and chimneys 15.

A complete circulation of the products of combustion, both above and below the brooding-chamber and through the center thereof, is thereby created from the lamp to the atmosphere. It will also be seen that there is a circuit of fresh air through the apparatus including the brooding-chamber. The air enters through the opening 20, passes through the annular space between the chimney 30 of the lamp and the funnel 32 into the annular passage 23 in the conduit 16, surrounding the pipe 22. From this annular passage 23 the air enters the brooding-chamber through the opening 33 beneath the covers 36 of the hover and within the hover-cloth 39. From the brooding-chamber the air passes through the openings 50 in the partitions 47 into the triangular compartments 48, and thence is carried off through the chimneys 15 with the products of combustion from the escape-flues 51. The fresh air passing through the annular passage 23 is heated by the products of combustion in the pipe 22 and is admitted through the opening 33 to the inside of the hover in a heated condition. The circulation of air is created and maintained through the apparatus over the course traced by coming in contact with the heated exterior walls of the escape-flues 51 in the compartments 48 and by induction caused by the upward flow of the products of combustion in the chimneys 15, where the air and said products of combustion mix.

To provide for the downward movement of the heated air to the lower portions of the brooding-chamber as the same enters the latter through the opening 33 and to prevent the accumulation of heated air in the upper part of said chamber without first descending to the lower portions thereof where the chicks are located, I employ a deflector 52, which is hood-shaped in form, as clearly shown in Figs. 4 and 5 of the drawings, and is located at the upper central portion of the brooding-chamber within the hover. The same is provided with a thimble or tubular extension 53, which fits within the opening 33 and is frictionally or otherwise secured to the conduit 16 around said opening. The air as it enters the brooding-chamber through the opening 33 is prevented by the deflector 52 from rising to the upper part of said chamber without first descending to the lower portions thereof.

The outer portion of the pipe 46, which extends through the center of the brooding-chamber within the hover 35, is preferably provided with a tubular covering 54, of cork or other suitable insulating material. This covering is provided for the purpose of preventing the chicks being burned by direct contact with the exterior surface of the metal pipe 46.

For automatically regulating the temperature within the brooder I provide in the upper wall of the conduit 16 an opening 55 for the escape of the heated air in said conduit prior to its admission to the brooding-chamber. This opening is normally covered by a valve or damper 56, pivotally mounted upon a bracket 57 and having a crank-arm 58 thereon, which is connected through a loop 59 with the thermostat 60. The said thermostat may be of any suitable form or construction, the same being secured at its inner end to the bottom wall of the conduit 16 and projecting outwardly through the space between the covers 36 of the hover 35. I also provide a supplemental opening 61 in the upper wall of the conduit 16, which is controlled by a hand-operated slide or damper 62. The latter opening is designed to provide means for controlling the temperature within the brooding-chamber when the thermostat 60, which controls the passage through the opening 55, is insufficient or when it is desired to cool off the brooding-chamber to a greater extent than could be done by means of the opening 55 and the valve or damper 56, which operates in connection therewith.

If for any reason it is desired to dispense with the bottom heat in the brooder, it is merely necessary to cut off the passage between the pipe 22 and the space 44 beneath the flooring 43. This I propose to accomplish by means of a slide-valve 63 in the pipe 34, as clearly shown in Fig. 4 of the drawings. This valve may consist of an ordinary flat strip of sheet metal mounted in slides or guideways on opposite sides of the pipe 34 and designed when in its innermost position to cut off the passage through said pipe and when in its outermost position, as shown in Fig. 4, to open the passage through said pipe. Of course when the valve 63 is closed it is necessary to provide some means of escape for the products of combustion in the pipe 22. This I effect by removing the cap 28 from the end of the cap 25, as will be readily understood. It may also be found expedient to dispense with the bottom heat in the brooding-chamber at all times. In this event I do away with the supplemental double bottom 40 and the pipes 34 and 46 entirely. The cap 28 is then removed or the end of the pipe 22 is left permanently uncovered, so that the products of combustion from the lamp 21 may pass entirely through the brooder at the upper part thereof. All the heat supplied to the brooding-chamber is then obtained from above.

It has heretofore been stated that the cover 4 of the brooder-casing is removable, and it has also been stated that the conduit 16, the pipe 22, the chimney 30, the funnel 32, the lamp-box 18, the pipe 34, and the hover 35 are all permanently connected to each other. They are also detachably connected with the other parts of the device, the pipe 34 having a slip-joint connection with the pipe 46 and the conduit 16 resting within the sockets or openings in the upper edge of the ends 2. When, therefore, the cover 4 is removed, the conduit 16 and the parts above described as being connected therewith may be entirely removed from the remaining portions of the brooder. This is an important feature of my invention, as it enables me when the chicks reach a sufficient size and age to entirely remove the heating apparatus of the brooder and employ merely the brooder-casing, in which the chicks may find shelter. When the parts above described are removed, the supplemental or double bottom 40 may also be removed and the same cleaned by introducing suitable cleaning devices through the openings 45 in the edges thereof.

When the device is in operation and the products of combustion are led from the pipe 22 down through the pipes 34 and 46 into the space 44 beneath the flooring 43, it is necessary that some means be provided for causing the products of combustion to pass, to a certain degree at least, throughout all portions of the pipe 22 in order to furnish the top heat through the entire length of the brooder. I have heretofore stated that the cap 25 is provided with a restricted opening 26 therein. This provides for the escape of a portion of the products and prevents the formation of a dead-air chamber in the pipe 22 between the pipe 34 and the end of the pipe 22 which contains the cap 25.

It has been stated heretofore that the chimney 30 is secured to and carried by a nipple 29 on the pipe 22. This construction enables me to provide a close joint between said chimney and said nipple, which will prevent the passage of any of the products of combustion from the lamp 21 into the annular passage 23, through which fresh air is supplied to the brooding-chamber. As the chimney 30, however, is carried by the pipe 22 and as the latter is secured to the conduit 16, it is necessary that means be provided for raising and lowering the conduit 16, so as to enable the lamp 21 to be introduced into and removed from the lamp-box 18, in which it is located when in operation. The conduit 16 extends through the openings 13 in the ends 10 of the cover 4 and is normally held in its lowermost position by the engagement of the pivoted flap 14 with the upper wall thereof. By swinging the flap 14 upwardly on its hinges or pivots the height of the opening 13 in which it is located is increased, and then the end of the conduit 16 which passes through the said opening may be readily raised to a limited extent for the purpose of introducing the lamp into the box 18 beneath the chimney 30. This vertical movement of one end of the conduit 16 and the parts connected therewith does not necessitate the removal of the cover 4 and does not interfere with any of the other working parts of the device, the slip-joint connection between the pipes 34 and 46 providing for the separation of these parts without breaking the continuity of the passage for the products of combustion through the brooder.

It is frequently desirable to utilize a single brooder for raising two or more broods of chicks of different sizes and ages. It is important, however, that the different broods be kept separate from each other. I have provided means whereby this may be done, the same consisting of a removable partition 64, made up of two sections 65 and 66, connected to each other by a semicircular flexible metallic strap 67, which when the partition is in place partially encircles the pipe 46 at the center of the brooding-chamber. The lower edge of each section of this partition is provided with dowel-pins 68, designed to fit within corresponding openings 69 in the flooring 43. By this construction it will be seen that when it is desired to provide two compartments in the brooder it may be done by inserting the partition 64 in place prior to the introduction of the conduit 16 and the parts connected therewith. The said partition will be held in place and supported in upright position by the engagement of the dowel-pins 68 with the sockets in which they fit. If it is desired to have but a single brooding-chamber, the partition 64 may be readily removed.

It will be noted that the bottom heat in the device, or that which is applied to the flooring 43 of the brooding-chamber, is obtained from the products of combustion in the pipe 22, located in the upper part of the brooder. By this construction the necessity for raising or elevating the brooder, so as to heat the bottom of the brooding-chamber by a lamp or other heating device located beneath the same, is dispensed with. My improved device may therefore be located directly on the ground, and the opening 6 will be so disposed that the chicks may freely pass into and out of the brooder without the necessity of walking up and down an incline.

The opening 26 in the cap 25 on the end of the pipe 22 has been described as being provided for the purpose of preventing the formation of a dead-air chamber in the pipe 22 between the branch 34 and the rear end of said pipe. It is of course obvious that similar means must be provided in the conduit 16 to allow a small portion of the heated air therein to escape, so as to heat the upper part of the brooding-chamber throughout the entire length of the brooder. The opening referred to in the end of the conduit 16 is designated by the numeral 70.

One of the important features of my invention upon which I desire to lay particular stress is the provision of means whereby light may be admitted from above to the interior of the hover 35. This means consists of the windows or openings 38 in the hinged covers 36 of the hover. Unless some means be provided for admitting light to the inside of the hover it is difficult to get the chicks to pass into the same when heat or shelter is desired. Furthermore, as light is essential to the growth and development of the chicks the same may be obtained even though the chicks remain inside the brooder, within the hover.

Having now described my invention, what I claim is—

1. In a brooder, a pipe for carrying off products of combustion, extending through the upper part of the brooding-chamber, a lamp communicating with said pipe at a point intermediate its ends, a branch leading from said pipe at a point intermediate its ends, and removable caps on the opposite ends of said pipe, as and for the purpose set forth.

2. In a brooder, a lamp or heating device, a pipe extending through the upper part of the brooding-chamber for carrying off the products of combustion from said lamp, a branch leading from said pipe at a point intermediate its ends, a removable cap on one end of said pipe having a restricted opening therein and a contracted neck, and a second cap removably mounted on said neck.

3. In a brooder, a lamp, a vertically-movable pipe extending through the brooding-chamber for carrying off the products of combustion from said lamp, and a chimney for said lamp carried by said pipe and communicating with the interior thereof.

4. In a brooder, a lamp, a pipe extending through the brooding-chamber for carrying off the products of combustion from said lamp, a chimney for said lamp carried by said pipe and communicating with the interior thereof, a vertically-movable conduit in which said pipe is mounted, the said conduit surrounding said pipe and forming therewith an annular passage which communicates with the brooding-chamber, and a funnel carried by said conduit, surrounding said chimney and communicating with said passage, for the admission of fresh air thereto.

5. In a brooder, a casing having openings in the ends thereof, a lamp, a pipe extending through the brooding-chamber for carrying off the products of combustion from said lamp, a chimney for said lamp carried by said pipe and communicating with the interior thereof, a vertically-movable conduit in which said pipe is mounted, the said conduit extending through the openings in the ends of said casing, surrounding said pipe and forming therewith an annular passage which communicates with the brooding-chamber, a funnel carried by said conduit, surrounding said chimney and communicating with said passage for the admission of fresh air thereto, and a pivoted flap or filling-piece at the upper end of the opening in one of the ends of said casing, as and for the purpose set forth.

6. In a brooder, a floor for the brooding-chamber having a space beneath the same, a lamp, a pipe extending through the upper part of the brooding-chamber for carrying off the products of combustion from said lamp, connections between said pipe and the space beneath said floor, extending vertically through the center of the brooding-chamber, a conduit surrounding said pipe, forming an annular passage, the said conduit being provided with an opening adjacent to said lamp for the admission of air and with an opening communicating with the brooding-chamber, and escape-passages to the atmosphere leading from the lower part of said brooding-chamber and from said space at the corners of the brooder.

7. In a brooder, a floor for the brooding-chamber having a space beneath the same, a lamp, a pipe extending through the upper part of the brooding-chamber for carrying off the products of combustion from said lamp, a chimney for said lamp carried by said pipe and communicating with the interior thereof, a slip-joint connection between said pipe and the space beneath said floor, a vertically-movable conduit in which said pipe is mounted, the said conduit surrounding said pipe, forming therewith an annular passage, and having an opening therein adjacent to said lamp for the admission of fresh air and a second opening communicating with the brooding-chamber, and escape-passages to the atmosphere leading from the lower part of said brooding-chamber and from said space.

8. In a brooder, a lamp or heating device, a pipe extending through the upper part of the brooding-chamber for carrying off the products of combustion from said lamp, a conduit surrounding said pipe, forming an annular passage, the said conduit being provided with an opening adjacent to said lamp for the admission of air and with an opening communicating with the brooding-chamber, and a deflector in the brooding-chamber adjacent to the latter opening.

9. In a brooder, a lamp or heating device, a pipe extending through the upper part of the brooding-chamber for carrying off the products of combustion from said lamp, a conduit surrounding said pipe, forming an annular passage, the said conduit being provided with an opening adjacent to said lamp for the admission of air and with an opening communicating with the brooding-chamber, and a hood-shaped deflector in the brooding-chamber having a tubular stem thereon which fits within the latter opening.

10. In a brooder, a hover in the brooding-chamber, having an opening in the top thereof, and a conduit for hot air communicating with said opening for introducing a current of warm air from above the hover downwardly through the upper part thereof.

11. In a brooder, a hover in the brooding-chamber, means for introducing a current of warm air through the upper part thereof, and a deflector within said hover for causing the downward movement of said current of air.

12. In a brooder, a conduit for heated air having an opening therein communicating with the upper part of the brooding-chamber, a hover in said chamber beneath said conduit and surrounding said opening, and a hood-shaped deflector within said hover having a tubular stem thereon, which fits within said opening.

13. In a brooder, a conduit for heated air having an opening therein communicating with the upper part of the brooding-chamber, and a hover in said chamber beneath said conduit and surrounding said opening, the said hover having its top or cover made in sections pivoted to said conduit.

14. In a brooder, a conduit for heated air having an opening therein communicating with the upper part of the brooding-chamber, and a hover in said chamber beneath said conduit and surrounding said opening, the said hover comprising two cover-sections hinged to opposite sides of said conduit, transversely-extending strips secured to the lower sides of said sections, projecting beyond the inner edges thereof, cut away to receive said coning from the lower part of said brooding-chamber and from said space.

24. In a brooder, a floor for the brooding-chamber having a space beneath the same, a lamp, a pipe extending through the upper part of the brooding-chamber for carrying off the products of combustion from said lamp, a removable cap on the end of said pipe opposite said lamp, a branch leading from said pipe at a point intermediate its ends and communicating with the space beneath said floor, a valve or cut-off in said branch, a conduit surrounding said pipe, forming an annular passage, the said conduit being provided with an opening adjacent to said lamp for the admission of air and with an opening communicating with the brooding-chamber, and escape-passages to the atmosphere leading from the lower part of said brooding-chamber and from said space.

25. The combination with the brooding-chamber of a brooder, of a removable partition for dividing said chamber into a plurality of compartments.

26. The combination with the brooding-chamber of a brooder, having vertical openings in the floor thereof, of a partition for dividing said chamber into a plurality of compartments, the said partition having dowel-pins projecting from the lower edge thereof and adapted to fit within said openings.

27. In a brooder, the combination with the hollow floor of the brooding-chamber having a vertical pipe extending upwardly therefrom for conveying a heating medium to the interior of said hollow floor, of a partition for dividing the brooding-chamber into a plurality of compartments having means thereon for detachably connecting the same to said floor, the said partition comprising two sections and a semicircular flexible connecting-strap between said sections designed to embrace said pipe when the partition is in operative position.

28. In a brooder, a hover having the top or cover thereof made in sections pivoted to a common support and having openings therein for the admission of light to the interior of the hover.

In testimony whereof I have hereunto set my hand in presence of two subscribing witnesses.

WALTER P. JONES.

Witnesses:
WM. M. STOCKBRIDGE,
S. S. MARR.